US005112525A

United States Patent [19]

Straw et al.

[11] Patent Number: 5,112,525

[45] Date of Patent: May 12, 1992

[54] METHOD FOR MAKING A POST-FOAMING GEL

[75] Inventors: Alan Straw, Cheshire; Roger D. Ellis, Lancashire, both of United Kingdom

[73] Assignee: Colgate-Palmolive Company, Piscataway, N.J.

[21] Appl. No.: 476,965

[22] Filed: Feb. 7, 1990

Related U.S. Application Data

[62] Division of Ser. No. 131,222, Dec. 10, 1987, Pat. No. 4,915,881.

[51] Int. Cl.[5] ........................ B01J 13/00; B65B 1/04; C09K 3/30; C11D 17/00

[52] U.S. Cl. .................................... 252/315.3; 141/3; 252/90; 252/305; 252/307; 252/314; 261/DIG. 26

[58] Field of Search ............ 252/305, 307, 314, 315.3; 261/DIG. 26; 141/3; 366/91, 101, 106, 107; 521/56

[56] References Cited

U.S. PATENT DOCUMENTS

| | | | |
|---|---|---|---|
| 3,291,348 | 12/1966 | Chibret et al. | 141/3 X |
| 3,541,581 | 11/1970 | Monson | 252/90 |
| 3,756,576 | 9/1973 | Tremolada | 261/DIG. 7 |
| 3,860,218 | 1/1975 | Hürlimann | 366/268 |
| 4,350,650 | 9/1982 | Cereghini | 366/268 X |
| 4,405,489 | 9/1983 | Sisbarro | 252/315.4 |
| 4,589,452 | 5/1986 | Clanet | 141/3 |
| 4,626,376 | 12/1986 | Pean | 252/305 |
| 4,673,296 | 6/1987 | Sjogren | 366/269 X |
| 4,755,377 | 7/1988 | Steer | 252/315.3 X |
| 4,915,881 | 4/1990 | Straw et al. | 261/152 |
| 4,980,085 | 12/1990 | Straw et al. | 252/314 |

*Primary Examiner*—Richard D. Lovering
*Attorney, Agent, or Firm*—Richard J. Ancel; Robert C. Sullivan

[57] ABSTRACT

A method of making a post foaming gel comprising the following steps: A gel base is cycled between first and second cylinders and a heat exchanger. A foaming agent is introduced to the cycled gel base through the heat exchanger while the gel base is being cycled.

1 Claim, 2 Drawing Sheets

METHOD FOR MAKING A POST-FOAMING GEL

This is a division of application Ser. No. 131,222, filed Dec. 10, 1987, now U.S. Pat. No. 4,915,881.

BACKGROUND OF THE INVENTION

The present invention relates to an apparatus and method for making a post-foaming gel.

Before the present invention, attempts have been made to add foaming agents, commonly low pressure propellant mixtures, such as pentane/butane mixtures to gel bases in conventional partly-filled pressure vessels to make a post-foaming gel. However, any post-foaming gel of cosmetically acceptable stiffness will tend to foam spontaneously when exposed to atmospheric pressure if it contains bubbles of air or hydrocarbon. These act as nuclei for foaming, by expanding and shearing the gel in their immediate vicinity. This means that pentane/butane mixtures cannot be incorporated into gel base in a conventional, partly-filled pressure vessel, even when the headspace is pressurised with air or nitrogen. Inevitably some of the water-insoluble gas will be entrained in the gel. The resulting spontaneous foaming makes filling into cans very difficult and messy. Even then the product will not settle down on storage to give a satisfactory result.

Taking a potentially 'easy' situation, such as adding only isopentane (B.Pt. 29° C.) or n-pentane (B Pt 37° C.), there are still problems. Assuming a good gel is produced by cold mixing, you will find that at temperatures around 20° C. the mixing does vaporise significant amounts of foaming agent and the resulting gel is foamy.

These bubbly gels are not suitable for packing into cans because the external propellant used with the cans gives insufficient pressure to collapse the bubbles on storage. This is largely due to the fact that these gels have a yield value such that they resist the applied pressure (or fail to transmit the full effect to the bubbles).

A post-foaming gel is disclosed in U.S. Pat. No. 3,541,581. A continuous method and apparatus to make a post-forming gel is disclosed in U.S. Pat. No. 4,405,489. The filling of an aerosol can containing an interior plastic bag which holds the product to be dispensed is disclosed in U.S. Pat. No. 4,589,452.

SUMMARY OF THE INVENTION

A principal feature of the present invention is the provision of an apparatus for making a post-foaming gel.

The apparatus of the present invention comprises, a first cylinder having a chamber and a slidable piston separating the chamber into a first compartment to receive a gel base and a second compartment, and a second cylinder having a chamber and a slidable piston separating the chamber into a first compartment to receive a gel base and a second compartment, with the first compartments of the first and second cylinders facing each other. The apparatus has a shaft connecting the pistons of the first and second cylinders, and conduit means connecting the first compartment of the first and second cylinders.

A feature of the present invention is the provision of means for reciprocating the piston in the first and second cylinders to cycle the gel base through the conduit means between the first compartments of the first and second cylinders.

Yet another feature of the invention is the provision of means for introducing foaming agent to the gel base while it is being cycled between the cylinders.

Thus, a feature of the present invention is that the apparatus forms a post-foaming gel from the gel base and foaming agent in a simplified manner.

Another feature of the present invention is the provision of a coupling on the shaft for adjustment to allow for volume of the added foaming agent.

A further feature of the present invention is that the apparatus eliminates the necessity for a motor drive pump.

Yet another feature of the invention is that the apparatus is flame proof.

Still another feature of the invention is that the cycle time for forming the post-foaming gel is reduced.

A feature of the present invention is that the apparatus is of simplified construction and can be made at a reduced cost.

Further features will become more fully apparent in the following description of the embodiments of this invention and from the appended claims.

DESCRIPTION OF THE PREFERRED EMBODIMENTS

Figure 1:
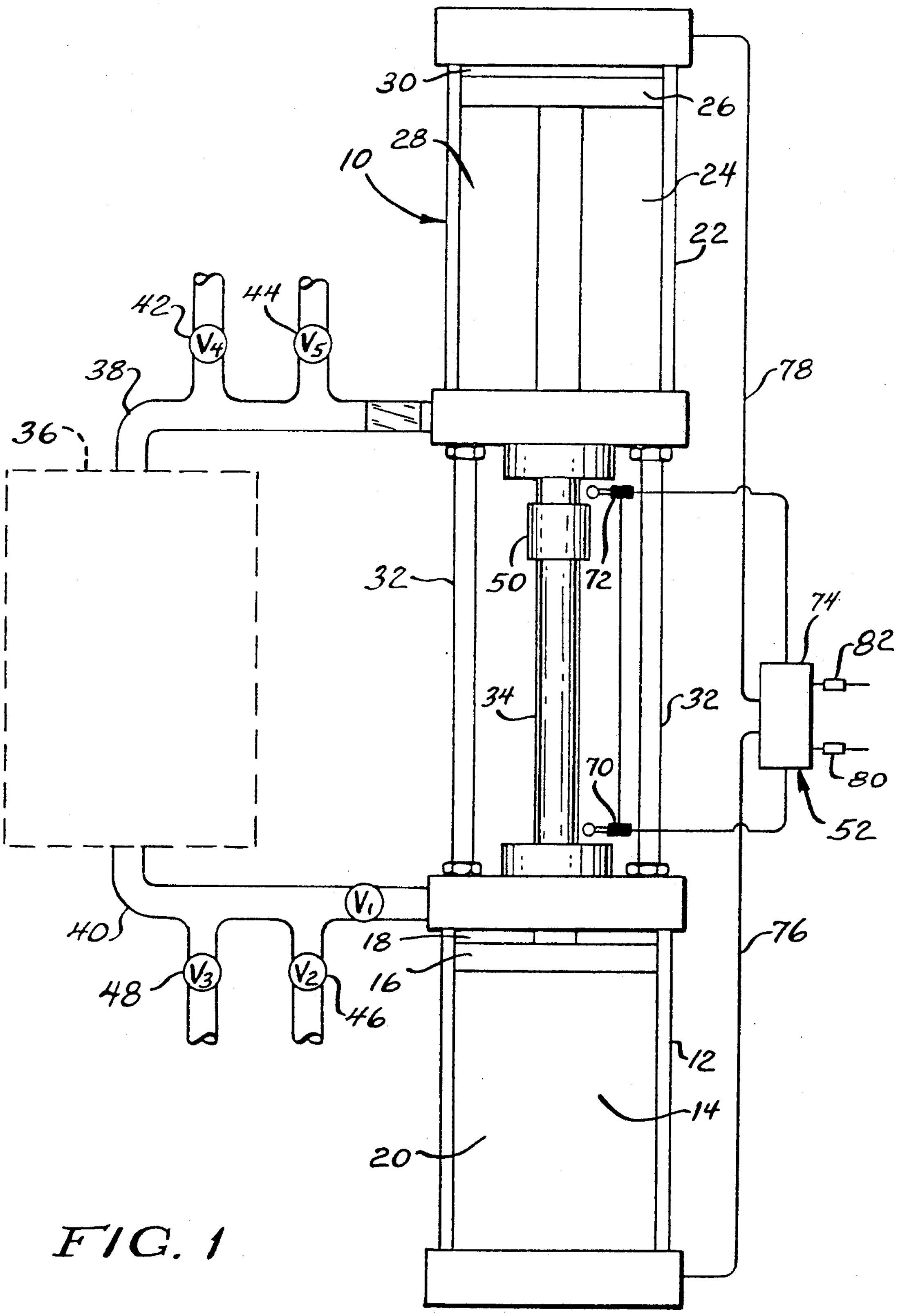
FIG. 1 is a diagrammatic view of an apparatus for making a post-foaming gel of the present invention.

Referring now to FIG. 1, there is shown an apparatus generally designated 10 for making a post-foaming gel from a gel base and foaming agent. The apparatus 10 has a first cylinder 12 having a chamber 14 and a slidable piston 16 separating the chamber 14 into a first compartment 18 to receive a gel base and a second compartment 20 to receive a compressed gas. The apparatus 10 has a second cylinder 22 having a chamber 24 and a slidable piston 26 separating the chamber into a first compartment 28 to receive the gel base and a second compartment 30 to receive a compressed gas.

As shown, the first and second cylinders 12 and 22 may be connected together by a pair of rods 32, with the first compartment 18 and 28 of the first and second cylinders 12 and 22 facing each other. The apparatus 10 has a shaft 34 connecting the pistons 16 and 26 of the first and second cylinders 12 and 22, respectively, such that movement of the pistons are imparted to each other by the shaft 34.

The apparatus has a heat exchanger 36, and a first conduit 38 connecting the heat exhanger 36 to the first compartment 28 of the second cylinder 22, and a second conduit 40 connecting the heat exchanger 36 to the first compartment 18 of the first cylinder 12. The first conduit 38 has a first valve 42 for introducing a foaming agent into the first conduit 38. The first and second conduits 38 and 40 have respective valves 44 and 46 for a purpose which will be described below. Also, the second conduit 40 has a valve 48 for connecting the system to a vacuum in order to eliminate air from the apparatus. The shaft 34 has a coupling 50 for a purpose which will be described below. The apparatus 10 also has a device 52 for sequentially introducing and removing gas into and from the second compartments 20 and 30 of the first and second cylinders 12 and 22 in order to reciprocate the pistons 16 and 26 in the first and second cylinders 12 and 22 to cycle the gel base through the first and second conduits 38 and 40 and heat exchanger 36 between the first and second cylinders 12 and 22. The device 52 comprises a pneumatic control system which cycles the pistons based on air pressure signals from switches operated by the piston shaft.

As shown in FIG. 1, the device 52 has a pair of switches 70 and 72 which are sequentially actuated by the coupling 50 as the coupling approaches the respective opposed cylinders 12 and 22. The switches 70 and 72 are connected to a control system 74 of known type which sequentially removes and introduces air under pressure from and to the second compartments 20 and 30 of the respective cylinders 12 and 22 through conduits 76 and 78 which are connected between the second compartments 20 and 30 and the control system 74. The control system 74 is connected to a pair of inlet conduits 80 and 82 to supply compressed air to the control system 74, and the control system 74 is selectively connected to an exhaust.

Figure 2:
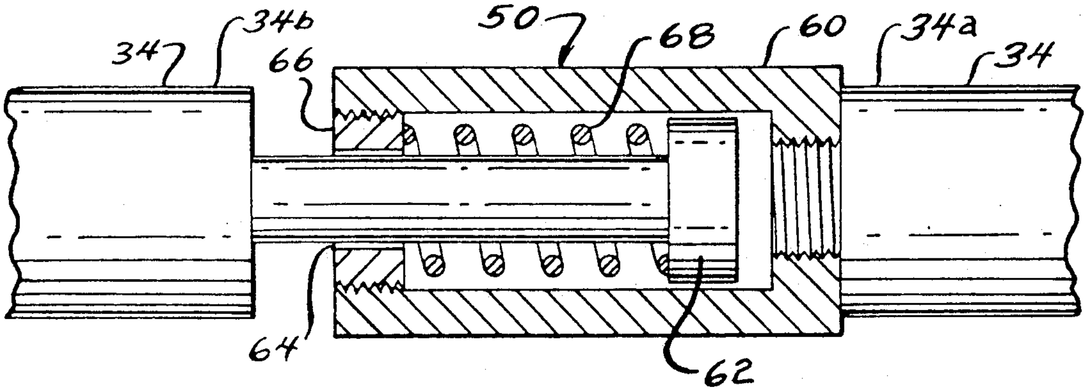
FIG. 2 is an elevational view, taken partly in section, of a coupling for the apparatus of FIG. 1.

As shown in FIG. 2, the coupling 50 comprises a hollow sleeve 60 secured to shaft segment 34*a*. An outer enlarged end 62 of shaft segment 34*b* is slidably received in the sleeve 60 through an opening 64 of the sleeve 60, and the shaft end 62 is biased away from an annular flange 66 of the sleeve 60 by a helical spring 68 extending between the flange 66 and shaft end 62.

The gel base is made in the following manner according to the formulation set forth below:

(1) Add approximately 20% of the water to a closed mixing vessel.

(2) Add fatty acid to the mixing vessel and then the GMS/color then heat to 80°-85° C. until all powders are molten.

(3) Add the triethanolamine to the vessel with agitation to form a soap. Cool to 60° C. Add the Hydroxyethyl cellulose.

(4) Cool to 40° C. and add the Hydroxypropyl cellulose.

(5) Add the sorbitol solution, with agitation, to the aqueous soap.

(6) Cool the mixture to 30° C., add the perfume with agitation.

The gel base has the following formulation:

| BASE | % |
|---|---|
| Palmitic Acid | 8.0-10.0 |
| Stearic Acid | 1.0-3.0 |
| Triethanolamine | 5.5-7.5 |
| Sorbitol - 70% solution | up to 3.0 |
| Hydroxyethyl cellulose | 0.1-0.4 |
| Hydroxypropyl cellulose | 0.05-0.15 |

-continued

| BASE | % |
|---|---|
| Glyceryl Monostearate | 0.4-0.6 |
| Perfume | q.s. |
| Coloring Material | q.s. |
| Water | to 100% |

The finished product has the following formulation:

| FINISHED PRODUCT | |
|---|---|
| Base as above | 97.0-98.0 |
| Iso-Pentane | 1.5-1.8 |
| Iso-Butane | 0.5-1.2 |

As shown in FIG. 1, the first cylinder 12 has a piston 16 located such that no gel base is located in the first compartment 18, while the first compartment 28 of the second cylinder 22 is filled with gel base. Utilizing air pressure, as controlled by device 52, with suitable air control valves, the gel base is cycled back and forth between the first and second cylinders 12 and 22 through the first and second conduits 38 and 40 and heat exchanger 36. During cycling of the gel base, a foaming agent is added to the gel base through the valve 42 in the first conduit 38, with the foaming agent comprising iso-pentane and iso-butane. During addition of foaming agent to the apparatus 10, the shaft coupling 50 is adjusted to allow for the volume of the foaming agent. During foaming agent addition, the cylinders are cycled to avoid accumulation of undispersed material, and final total cycling is dependent on conditions such as formula and temperature.

After cycling has been completed, aerosol cans having two compartments are filled from either valve 46 or valve 44, and adjusting air pressure to give controlled delivery of gassed gel. The aerosol valves are crimped in place and the outer compartments of the cans are gassed with a few grams of propellant after which the samples are ready for use.

In this manner, a post foaming gel is formed in a simplified manner by the apparatus. According to a method of making a post-foaming gel, a gel is cycled between first and second cylinders, and a foaming agent is introduced to the cycled gel base.

The foregoing detailed description is given for clearness of understanding only, and no unnecessary limitations should be understood therefrom, as modifications will be obvious to those skilled in the art.

What is claimed is:

1. A method of making a post-foaming gel, comprising the steps of: cycling a gel base between first and second cylinders and a heat exchanger; and introducing a foaming agent to the cycled gel base through said heat exchanger while said gel base is being cycled.

* * * * *